Patented July 6, 1943

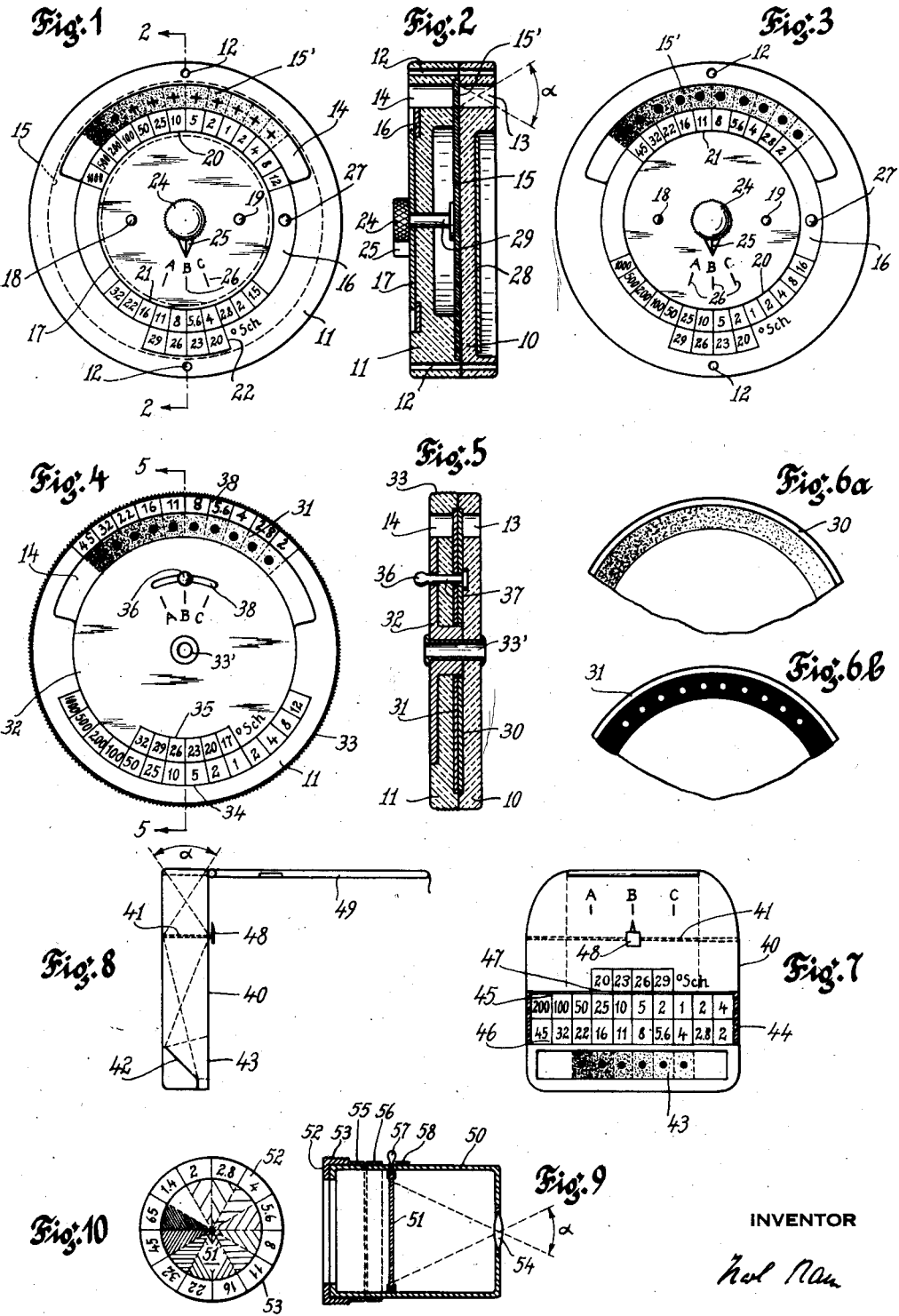

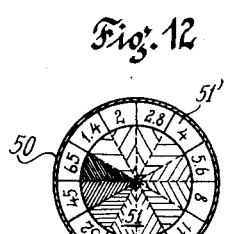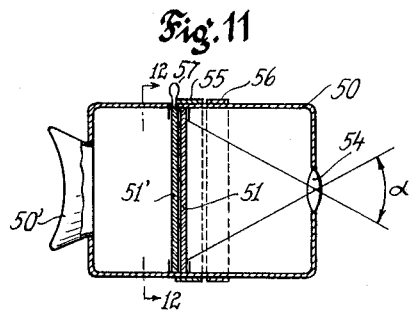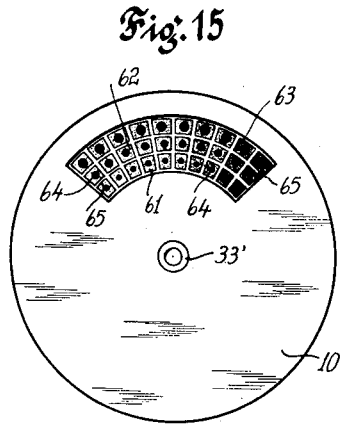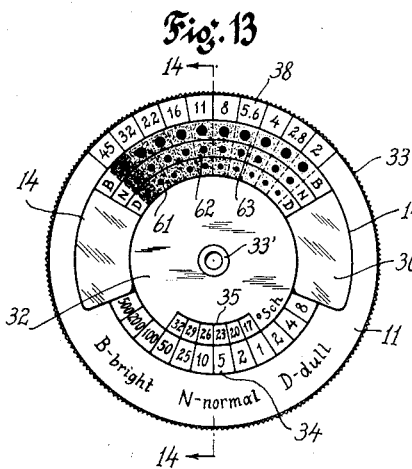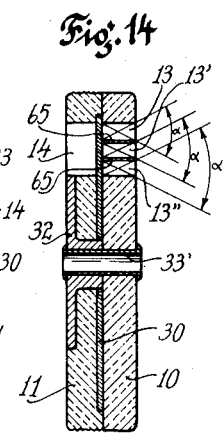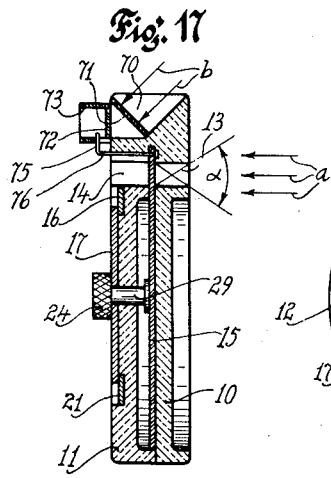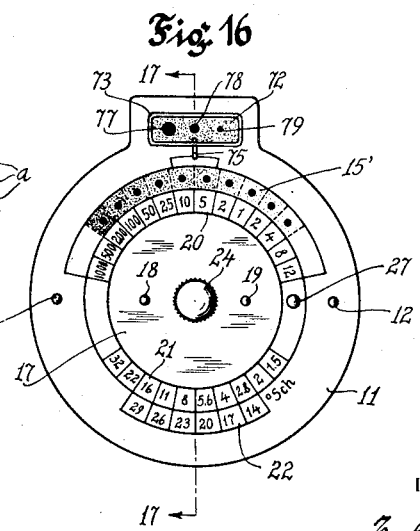

2,323,676

UNITED STATES PATENT OFFICE 2,323,676

PHOTOGRAPHIC EXPOSURE METER

Karl Rath, New York, N. Y.

Application May 12, 1941, Serial No. 393,007

9 Claims. (Cl. 88—23)

My invention relates to optical photographic exposure meters for determining the correct shutter speed and lens aperture or "stop" value for a photographic camera or like apparatus under varying light or illuminating conditions and for a given plate or film emulsion speed to ensure a perfectly exposed picture.

More particularly, the invention is concerned with an extinction type exposure meter involving the use of a graduated or step wedge as a light measuring element having adjacent fields or areas of varying light permeability or density which serve to cause the contrast or detail of a mark or image to disappear or become barely visible when the wedge is subjected to trans-illumination by light rays emanating from a scene or object to be photographed the brightness of which is determinative of the correct exposure to be given to ensure a perfectly exposed picture.

Usually, the optical wedge in meters of this type either has to be moved in front of a viewing aperture or the like or a number or other mark read has to be transferred to a separate calculating device for translating a given object or scene brightness into appropriate exposure control values. In all these cases a manipulation or adjustment is required for each individual measurement or exposure determination rendering the use of such meters not only slow and cumbersome but giving rise to errors and wrong exposures in the hands of the usually non-technically inclined amateur or camera owner.

An object of my invention, therefore, is the provision of a substantially direct reading extinction type exposure meter which after having been once adjusted for the values used for a large number or majority of pictures such as film speed, frames/sec. in a motion picture camera, and a standard or generally used stop or shutter speed, may be directly and substantially instantly read for ascertaining the coordinated exposure value substantially without any additional adjustment or manipulation prior to each picture being taken.

Another object is to provide an extinction type exposure meter of simple design and construction which will enable the light measurement to be made with due consideration to the pictorially most important parts of an object or scene, such as the head of a person in portrait photography, thereby ensuring most favorable exposure for the parts or objects of greatest interest while allowing the remaining less important portions to be rendered adequately due to the emulsion latitude.

These and further objects of the invention will become more apparent from the following detailed description taken with reference to the accompanying drawings forming part of this specification and wherein:

Figure 1 is a front view of one form of exposure meter constructed in accordance with the principles of my invention, Figure 2 is a cross-section taken on line 2—2 of Figure 1, Figure 3 shows a modification of Figure 1, Figures 4 and 5 are front and cross-sectional views, respectively, of an exposure meter of modified construction embodying the principles of the invention, Figures 6a and 6b are partial views illustrating a suitable construction of a step wedge for use by the invention, Figures 7 and 8 are schematic diagrams in top and side view, respectively, of another exposure meter construction according to the invention, and Figures 9 and 10 are front and cross-sectional views, respectively, of still another embodiment of the invention, Figure 11 is a longitudinal cross-section of a further modification of the invention, Figure 12 is a cross-section taken on line 12—12 of Figure 11, Figure 13 is a front view of an improved type of exposure meter embodying the principles of the invention, Figure 14 is a cross-section taken on line 14—14 of Figure 13, Figure 15 is a rear view of the meter according to Figure 13, Figure 16 is a front view of a meter according to the invention embodying still a further improvement, and Figure 17 is a cross-section taken on line 17—17 of Figure 16.

Like reference characters identify like parts throughout the different views of the drawings.

Referring more particularly to Figures 1 and 2, I have shown a simple form of a direct reading extinction type exposure meter constructed in accordance with the principles of the invention. The meter illustrated comprises a pair of disc shaped bottom and top members 10 and 11, respectively, secured together in any suitable manner such as by screws or rivets passed through the mounting holes 12. Both members 10 and 11 are provided with aligned arcuate slots 13 and 14, respectively, in such a manner that an arc-shaped photometric wedge light gauge 15' applied to a disc 15 of Celluloid, cellulosic material, or the like will be visible to an observer when holding the meter so as to face a photographic scene or object covered by a field or viewing angle. The latter is suitably chosen by the design of the depth of the slot or thickness of the member 10 to correspond to the average field angle of the standard photographic camera or to be of lesser value, so as to encompass only the parts of major pictorial interest of the scene or object towards which the meter is held at a distance from the observer's eye in the reading position. The disc 15 is arranged in a corresponding depression of the inner surface of the member 11 and is arranged for rotation about its axis to move the wedge 15 within the slot 14 to predetermined positions for the purpose to be described presently. The member 11 is further provided with an annular shaped depression of its top face adapted to receive a rotatable scale ring 16 having an outer edge coinciding with the inner edge of the slot 14. The scale ring 16 is held in place by a cover plate or disc 17 secured to the top face of the member 11 by screws or rivets indicated at 18 and 19 and having an outer edge overlapping the scale ring 16.

The wedge 15' is provided in a known manner with a series of consecutive fields or areas of gradually varying light permeability or density, each field being provided with a mark, such as a circle or cross as shown in the example illustrated, in such a manner that the contrast between said marks relative to their adjacent areas varies increasingly from left to right and a distinct mark will just be barely discernible or its contrast or outline disappear to an observer for a predetermined scene or object brightness in a manner well understood. In the example shown, the density of the field at the extreme left has the greatest value and decreases gradually towards the right, with the field at the extreme right having the lowest density or highest permeability to light rays. In practice it has been found advisable to provide marks which are transparent to varying degrees in the manner described from left to right and which are encircled by black or opaque areas similar to a stencil. A suitable way of constructing a wedge of this type is to provide a pair of superposed sheets one of which forms a wedge of gradually decreasing density and the other being opaque and having suitable marks such as circles or other indicia forming transparent portions as shown in Figures 6a and 6b, respectively. Alternatively, a wedge comprising a single opaque sheet with marks of varying density produced by a photographic printing process may be employed for the purpose of the invention.

In order to translate or evaluate a given object or scene brightness ascertained in the manner described by determining the mark whose outline or details are just barely visible into appropriate exposure control values for a camera, the meter according to the invention is provided with a number of relatively adjustable scale members correlated to and cooperatively associated with the step wedge in the viewing slot acting as the light measuring element in such a manner as to allow of an instantaneous reading of the required exposure setting substantially without the necessity of any manipulation or individual adjustments prior to each picture to be taken. To this end, in the example shown in Figure 1, the rotatable scale ring 16 is provided with a pair of adjacent scales 20 and 21 calibrated, respectively, in shutter speed numbers, in the example shown from 1/1000 to 12 seconds, and in relative lens aperture or "stop" numbers, in the example shown from f1.4 to f32. The shutter speed scale 20 is arranged contiguous to and movable along the step wedge or brightness indicator 15' in the viewing slot, while a further relatively stationary scale 22 calibrated in film or emulsion speed values is applied to the top face of cover member 17 adjoining to and in cooperating relation with the lens aperture scale 21. This emulsion speed scale in the example shown comprises values from 20 to 29° Scheiner, whereby in a known manner twice or half the exposure will be required when changing from one to the next scale graduation.

In operation, a chosen stop number is set opposite to the speed number of the film or plate used by rotating the ring 16 by the aid of a knob 27 or the like. The film speed used remains the same as long as the same type film is used in the camera and by using an average stop for most or a greater number of pictures, the required shutter speed may be instantaneously read without any individual setting or manipulation by holding the meter at a distance from the observer's eye so as to face the object or scene which it is desired to photograph and ascertaining the shutter speed number on scale 20 opposite to the mark on the step wedge whose contrasts are just barely visible or extinguished under the existing scene or object brightness.

The results or readings obtained with extinction type exposure meters based on the subjective visual determination of the degree of contrast or detail between fields or areas of different transparency or density are dependent on the acuity of vision or sensitivity of the human eye in distinguishing between detail of light and shade varying with the average intensity of the light or illumination to which the eye is exposed. Thus, considering an object of given brightness, the eye will be able to distinguish between details of said object to a much greater degree in dark surroundings than for instance when exposed to bright sunlight, inasmuch as in the former case the pupil will be wide open while in the latter case it will be contracted to pin-point size. Conditions are somewhat more involved but this simple phenomena will be sufficient to explain the fact that the exposure values obtained from an extinction meter in dark surroundings, such as shadowy streets, forests, interiors will be too short and that a correction will have to be made to take into account the effect of the varying eye sensitivity factor. According to the present invention, this is realized by adjusting the step wedge 15' with respect to the shutter speed scale 20 by rotating the disc 15 by means of a knob 24 arranged at the end of a shaft 23 passing through bores in the members 11 and 17 and having its inner end secured to the disc 12 in any suitable manner. Knob 24 is provided with an index member or pointer 25 moving adjacent a scale having calibration marks 26 identified as A, B, C in the drawing. The marks A, B, C represent the average illumination or light to which the eye of the observer is exposed, mark A corresponding to dark surroundings such as interior scenes, shadowy streets and forests, mark B corresponding to average scenes or illumination, and mark C corresponding to intense sunlight such as sea and snow scapes. If desired, more than three average light values may be chosen, but it has been found that the general light conditions outlined will be sufficient to compensate for the varying eye sensitivity for most practical purposes. Experience has shown that with a short practice the average photographer will be enabled to properly estimate the existing average light condition and to correspondingly set the knob 24 to ensure a perfectly exposed picture. For average conditions of illumination prevailing in a large number or majority of cases for the average camera owner knob 24 may remain set against mark B while the remaining settings are used for exceptional cases only.

Figure 3 being similar to Figure 1 shows a somewhat modified arrangement wherein the scales 20 and 21 on the member 16 have been interchanged, whereby the meter will be suitable for moving picture photography and for all other cases when it is desired to use a fixed shutter speed for most or a large number of pictures and to afford an instant reading of the required lens aperture or stop value. This is especially the case in miniature and candid photography which makes it desirable to use the same shutter speed such as 1/50 or 1/100 of a second in as many cases as possible to prevent jerking of the camera and blurred pictures. Thus, in Fig. 3 the number of frames per second, such as 8, 16, 32 and 64 to mention the most common values for moving picture cameras may be indicated adjacent to or in place of the corresponding shutter speeds 1/10, 1/25, 1/50 and 1/100 respectively. The operation of this meter will be similar to the operation of the meter shown in Figure 1, by setting a chosen shutter speed or frame number opposite to the speed number of the film used and reading the required stop on scale 21 opposite to the field of the step wedge whose mark, in the example shown in the form of a circle, is just barely discernible in the manner described.

Instead of moving the entire step wedge in the manner described hereinabove to take into account the varying eye sensitivity, the wedge may be composed of two parts 30 and 31 as shown in Figures 6a and 6b, one of which is stationary and the other adjustable in accordance with the existing average illumination. The construction of a meter using this type of wedge is shown in Figures 4 and 5. In this embodiment the parts 10 and 11 are relatively rotatable, the latter being provided with a roughened or knurled edge 33 for this purpose. The wedge is composed of two discs 30 and 31, Figure 6a and Figure 6b, arranged in corresponding depressions of the opposing inner faces of the members 10 and 11. The discs 30 and 31 are provided with control openings encircling the hub of a top or cover disc 32 fitting in a corresponding depression of the upper face of the member 11 and having its outer edge coinciding with the inner edge of the viewing slot 14. Members 10 and 32 are secured together by a screw or rivet 33' or in any other suitable manner to hold the separate parts together. The stationary top member 32 carries a scale 35 calibrated in film speed numbers and arranged adjacent to and cooperating with a shutter speed scale 34 applied to the upper face of the rotatable member 11 carrying a further aperture scale 36 adjoining to and movable along the step wedge in the viewing slot. The part 31 of the wedge element is mounted fixedly while the part 30 is arranged for rotation by the provision of a rod or stud 37 having its lower end secured to the disc 30 and arranged to move within an arcuate slot 38 in the cover 32 and member 11. Rod 37 is provided with a knob 39 moving opposite the eye sensitivity marks A, B, C, for adjusting the wedge in accordance with the existing light conditions in a manner substantially similar to that described hereinbefore. Disc 31 is either fixedly secured to the member 11 so as to follow the rotation of the latter in which case the transparent circles or other marks, Figure 6a, extend over the major part or the entire circumference of the disc. Alternatively the disc 31 is prevented from rotation by making the hub of disc 32 of square cross-section fitting a corresponding square shaped opening of the disc 31, while disc 30 has a circular opening to allow rotation by the aid of knob 39 in the manner described. In the latter case only a limited number of circles or other marks is necessary as is understood.

Referring to Figures 7 and 8, I have shown schematically another meter similar to that shown in Figure 3, wherein oblong scale members are provided in place of circular scales employed in the former. Item 40 represents a flat casing having mounted therein a wedge 41 at a distance from its light permeable front opening and embodying an inclined mirror or equivalent reflector 42 located at its rear end in such a manner as to reflect an image of the step wedge in an upward direction through the viewing opening or slot 43 if the meter is held in a horizontal position with the front opening facing a photographic scene encompassed by the angle α. Item 44 represents an adjustable scale member in the form of an endless band placed around the casing and moving within suitable guides and carrying adjacent shutter speed and stop scales 45 and 46, respectively, the former cooperating with a stationary film speed scale 47 applied to the top face of the casing. The wedge 41 may be moved to the left or right through a suitable guide by the aid of an operating knob or member 48 to take into account the varying eye sensitivity in substantially the same manner as described hereinbefore. The adjustment and operation of this meter is substantialy the same as in the case of the meter according to Figure 3 as will be readily understood. Item 49 is a cover hingedly connected to the front end of the casing serving as a protection in the closed or non-use condition of the meter and which may be swung to a position at right angle to top face of the meter casing as shown in the drawing to serve as a baffle or shield preventing front and lateral light reflections from interfering with the proper reading of the step wedge indication in the viewing slot.

Referring to Figures 9 and 10 I have shown still another modification of an extinction type exposure meter constructed according to the invention and adapted to obtain a reading with respect to preferred parts or portions of a scene or object to which it is desired to do full justice in the final reproduction in preference to other less important parts such as background, etc. The meter shown is of cylindrical shape comprising a housing 50 having mounted therein a circular wedge 51 provided with a series of sector shaped areas all converging into a single point in the center and having a gradually increasing light permeability or density. The front end of the casing is provided with an opening which may have a lens 54 mounted therein adapted to produce an image of the object or scene upon the wedge 51 in the same manner as upon the ground glass of a camera or view finder. The rear end of the housing 50 is provided with an adjustable ring having a cylindrical portion 53 to which is secured a scale 55 and an annular portion carrying a scale 52. A further stationary cylindrical scale 56 is applied to the housing adjacent to the scale 55 and further means are provided to rotate the wedge 51 within suitable guides by means of an operating knob 57 affixed to the wedge and moving within a slot in the meter housing 50. Knob 57 cooperates with a further fixed scale 58 applied to the outer face of the housing 50. Scale 52 in cooperative relation to wedge 51 is calibrated in stop numbers, scales 55 and 58 are calibrated in shutter speed and film speed numbers respectively while scale 56 represents the light sensitivity marks in a manner well understood from the foregoing. In operation the meter is held against a scene or object with the center of the circular step wedge coinciding with the point or part of major pictorial interest such as the head of a person. The sector within which the outlines or detail of the image are just barely visible or disappearing is then representative of the existing scene or object brightness and the stop number on the scale 53 opposite to this particular sector of the step wedge will be the one to be used in this particular case to ensure a correctly exposed picture. The presetting or adjustment of the other scales and further details and modifications of this meter will be readily evident from the description of the preceding embodiments of the invention.

As is understood, the lens 54 in Figure 9 may be omitted and the front opening designed to obtain a desired view angle in a manner similar to that according to Figures 2 and 5. It is also possible to interchange the stop scale 52 and shutter speed scale 55 or to construct scale 53 in the form of a disc with a central transparent part overlying the wedge 51 and arranged for rotation by means of a suitable actuating knob to which is attached the further scale 55. In a construction of this type, the wedge in Figures 9 and 10 may be mounted fixedly within the casing 50 and the rear end of the latter provided with an eye cup which when placed against the observer's eye excludes the surrounding light from the eye, thus allowing the latter to accommodate itself to a condition of substantially the same sensitivity in a manner well known. In this case judging of the general light condition and setting of the wedge may be dispensed with while retaining the advantage of securing an exposure indication with regard to a preferred portion of a scene or object in the manner described.

A construction of the latter type is shown in Figures 11 and 12. In the latter, two discs 51 and 51' are mounted within the housing 50. Disc 51 is stationary and provided with a circular wedge occupying its inner portion and leaving an outer annular-shaped transparent portion coinciding with a ring scale applied to the outer part of the rotatably arranged disc 51' whose inner part opposite to the step wedge is transparent. Disc 51' has secured thereto an operating knob projecting through a guide slot in the casing 50 and carrying a cylindrical scale member 55 sliding upon the outer surface of the casing. The end of the housing 50 opposite to the lens 54 is provided with an eye cup 50' which is pressed against the observer's eye in the reading position of the meter to exclude extraneous light, thus eliminating the necessity of a special eye sensitivity scale. In the example shown, the peripheral scale on the rotatable disc 51 represents stop values, the scale applied to the member 55 is calibrated in shutter speed numbers and a third relatively fixed scale is applied to the member 56 or directly to the casing and calibrated in emulsion speed values. Other details are similar to and understood from the description of Figures 9 and 10. In use, scale 55 is set relative to scale 56 by moving the knob 57 until a chosen shutter speed or number of frames per second is opposite to the speed number of the film used in the camera. The meter is then pressed closely against the eye to exclude extraneous light and after lapse of a few seconds to allow for proper accommodation, the required stop is read opposite to the field of the wedge which just causes the object or scene detail to disappear in the manner described in the foregoing.

Referring to Figures 13–15, I have shown a meter of the type according to the invention utilizing a different method of taking into account the varying eye sensitivity under different general light conditions. According to this embodiment the meter which is of substantially the same type to that shown in Figures 4 and 5 is provided with a wedge having three adjacent rows of marks such as circles of different size or relative contrast, each row being coordinated to a different average light condition such as bright, normal and dull surroundings as shown and marked by the letters B, N and D, respectively. For bright surroundings such as in sunlight a row 63 of large circles is provided, for normal light conditions the row of circles 62 are of medium diameter, while for dull light, such as dark streets, forests, interiors etc. when the eye sensitivity is greatest, a row of circles 61 of very small diameter serve as contrast marks. In this case the disc 30 carrying the step wedge units 61, 62, 63 is mounted fixedly, thereby eliminating a special adjusting member as provided in case of Figures 4 and 5. The meter is used in substantially the same manner as previously described by setting a chosen shutter speed on scale 34 opposite to the speed number of the film used on scale 35 and reading the coordinated stop number on scale 38 opposite to the field of the stop wedge whose mark is just barely discernible, taking into account in the present case the varying eye sensitivity by selecting the proper row of adjacent contrast marks 61, 62 and 63 in accordance with the existing general light condition.

In order to obtain the same view angle $\alpha$ for the wedge of increased width without having to unduly increase the thickness of member 10 or extend to depth of the baffle chamber, I provide a multiple or cellular baffle structure comprising lengthwise and cross walls 65 and 64, respectively, as seen more clearly from the rear view in Figure 15. In this manner a separate baffle chamber is provided in front of each field of the step wedge, thus not only presenting the same view angle $\alpha$, but affording a similar angular spread or limitation in both vertical and horizontal direction.

As is understood, such a multiple or cellular baffle is not limited to a multiple wedge arrangement as shown in Figures 13–15, but may be used with equal advantage in combination with a single wedge in the remaining embodiments to effect a field angle limitation in both vertical and horizontal directions. Another mode of considering the different eye sensitivities consists in positively determining or measuring the existing general light condition and evaluating the same by selecting a proper step wedge or adjusting a single wedge in the manner as shown by way of example in Figures 16 and 17. In the latter which shows a meter of the type according to Figures 1 and 2, there is provided a sensitivity determining device in the form of a further photometric wedge or extinction type light gauge comprising substantially a transparent or translucent plate 72 of medium density and having applied thereto a series of marks of different size or contrast, in the example shown three circles 77, 78 and 79 of consecutively decreasing diameter. This element, contrary to the step wedge for determining the scene or object brightness, is subjected to transillumination by light rays falling upon the eyes of the observer in the measuring position of the meter and determining the existing eye-sensitivity. For this purpose the part 10 of the meter is provided with an extension having an opening 70 allowing light rays in a direction substantially at about 45° (arrows b) to the direction of the light rays emanating from the scene or object to be photographed (arrows a) to impinge upon a diffusing plate 71 and to illuminate plate 72. The rays arriving in the direction of arrows b are those mainly affecting the observer's eyes and by ascertaining the mark on plate 72 whose contrast is just visible, the average light value may be determined and considered in the final exposure determination. In the example shown a baffle 73 is provided in front of the contrast indicator 72 to eliminate the effect of disturbing side light. The disc 15 carrying wedge 15' is provided with a pointer 76 moving within a recess in the slot 14 and having an outer end bent at right angle and moving over or opposite to the contrast marks of member 72. In use, wedge 15' is adjusted to its proper position by turning knob 24 until the pointer 76 is opposite the mark whose outline is barely visible. Thus, considering mark 78 to correspond to normal light conditions, mark 72 will become visible in its outline in dark surroundings, requiring movement of the wedge to the left, while in bright light only mark 77 will appear with a clear outline, requiring movement of the wedge to the right. As is understood, the average light conditions may be ascertained in the manner described and considered in the final exposure determination in any desired manner such as shown in Figures 13-15 or by any other method known in the art.

It is understood that the contrast marks on the step wedge may be omitted entirely and the existing scene brightness ascertained by the field through which light is just barely visible in the reading position without departing from the spirit of the invention, although the contrast marks shown will greatly facilitate the reading and brightness determination.

It will be evident from the foregoing that the invention is not limited to the specific details and arrangements of parts shown and disclosed herein for illustration, but that the underlying novel principle is susceptible of numerous variations and modifications coming within the broader scope and spirit of the invention as defined in the appended claims. The specification and drawings are accordingly to be regarded in an illustrative rather than in a limiting sense.

I claim:

1. An extinction type photographic exposure meter comprising a support, a photometric wedge light gauge mounted upon said support, said wedge having a series of substantially identical and adjacently situated visible test marks of increasingly varying density and surrounded by a common background, a scale member mounted upon said support substantially independently of said wedge and adjustable relative to said support, said scale member being provided with a first and a second scale each having adjacently situated graduations representing different exposure controlling values for a photographic camera, said first scale being arranged contiguous to and movable along said wedge, when said scale member is set to varying positions relative to said support, whereby to variably coordinate the marks of said wedge with the graduations of said first scale, and a third scale fixed relative to said support and having graduations representing values of a further exposure controlling factor, said third scale being arranged contiguous and in cooperative relation to said second scale, whereby upon initial adjustment of said scale member to align a pair of preselected values of said second and third scales, the coordinated exposure control value of said first scale for an existing scene brightness will be opposite to the mark on said wedge being just barely visible when the wedge is subjected to illumination by light rays emanating from a photographic scene in the operative position of said meter.

2. An extinction type photographic exposure meter comprising a support, a photometric wedge light gauge mounted upon said support, said wedge having a series of substantially identical and adjacently situated visible test marks of increasingly varying density and surrounded by a common background, a scale member mounted upon said support substantially independently of said wedge and adjustable relative to said support, said scale member being provided with a first and a second scale calibrated in coordinated lens aperture and exposure time values for a photographic camera, said first scale being arranged contiguous to and movable along said wedge, when said scale member is set to varying positions relative to said support, whereby to variably coordinate the marks of said wedge with the graduations of said first scale, and a third scale fixed relative to said support and calibrated in emulsion speeds, said third scale being arranged contiguous and in cooperative relation to said second scale, whereby upon initial adjustment of said scale member to align a pair of preselected values on said second and third scale, respectively, the coordinated value of said first scale for a given scene brightness will be opposite to the mark on said wedge being just barely visible when the wedge is subjected to illumination by light rays emanating from a photographic scene in the operative position of said meter.

3. An extinction type photographic exposure meter comprising a support, a photometric wedge light gauge mounted upon said support, said wedge having a series of substantially identical and adjacently situated visible test marks of increasingly varying density and surrounded by a common background, a scale member mounted upon said support substantially independently of said wedge and adjustable relative to said support, said scale member being provided with a first and a second scale calibrated in different exposure controlling values for a photographic camera, said first scale being arranged contiguous to and movable along said wedge, when said scale member is set to varying positions relative to said support, whereby to variably coordinate the marks of said wedge with the graduations of said first scale, a third scale fixed relative to said support and calibrated in values of a further exposure controlling factor, said third scale being arranged contiguous and in cooperative relation to said second scale, whereby upon initial adjustment of said scale member to align a pair of preselected exposure controlling values of said second and third scales, the coordinated exposure control value of said first scale for an existing scene brightness will be opposite to the mark on said wedge being just barely visible when the wedge held at a distance from the observer's eye is subjected to illumination by light rays emanating from a photographic scene in the operative position of said meter, and a further fixed scale upon said support having graduations representing a further factor determining the exposure reading, and means for independently adjusting said wedge relative to said support in accordance with the graduations of said further scale.

4. A visual exposure meter comprising a body, a photometric wedge light gauge mounted upon said body, said wedge having a series of adjacently situated visible test marks of increasingly varying density and surrounded by a common background, whereby the distance from one end of said wedge of the mark just barely visible if the wedge is illuminated in the operative position of the meter by light rays emanating from a photographic scene, is a measure of the scene brightness, a scale member mounted upon said body substantially independently of said wedge and adjustable relative to said body in accordance with varying values of a first exposure controlling factor, said scale member having adjacently situated scale graduations representing a second exposure controlling factor arranged contiguous to and movable along said wedge when said scale member is set to varying positions relative to said body, whereby to variably coordinate the marks of said wedge with said scale graduations, and means for adjusting said wedge relative to said body in accordance with varying values of an additional factor determining the exposure reading.

5. An extinction type photographic exposure meter comprising a body, a photometric wedge light gauge mounted upon said body, said wedge having a series of substantially identical and adjacently situated visible test marks of increasingly varying contrast relative to their adjacent areas, a scale member mounted upon said body substantially independently of said wedge and adjustable relative to said body, said scale member being provided with a first scale and a second scale calibrated in lens aperture and exposure time values, said first scale being arranged contiguous to and movable along said wedge, when said scale member is set to varyinug positions relative to said body, whereby to variably coordinate the marks of said wedge with the graduations of said first scale, and a third relatively fixed scale upon said body calibrated in values of a further exposure controlling factor, said third scale being arranged contiguous and in cooperative relation to said second scale, whereby upon adjustment of said scale member to align a pair of preselected values of said second and third scales the corresponding exposure value of said first scale for an existing scene brightness will be opposite the mark of said wedge just barely visible when the wedge is subjected to illumination by light rays emanating from a photographic scene in the operative position of said meter.

6. An extinction type photographic exposure meter comprising a body, a photometric wedge light gauge mounted upon said body, said wedge having a series of substantially identical and adjacently situated visible test marks of increasingly varying contrast relative to a common background, a scale member mounted upon said body substantially independently of said wedge adjustable relative to said body, said scale member being provided with a first scale and a second scale calibrated in exposure time and lens aperture values for a photographic camera, said first scale being arranged contiguous to and movable along said wedge, when said scale member is set to varying positions relative to said body, whereby to variably coordinate said marks with the graduations of said first scale, and a third relatively fixed scale upon said body calibrated in emulsion speeds, said third scale being arranged contiguous and in cooperative relation to said second scale, whereby upon initial adjustment of said scale member to align a pair of preselected values of said second and third scales, the corresponding exposure value of said first scale for an existing scene brightness will be opposite to the mark of said wedge just barely visible when the wedge is subjected to illumination by light rays emanating from a photographic scene in the operative position of said meter.

7. An extinction type photographic exposure meter comprising a body, a photometric wedge light gauge adjustably mounted upon said body, said wedge having a series of substantially identical and adjacently situated visible test marks of increasingly varying contrast relative to their adjacent areas, a scale member mounted upon said body substantially independently of said wedge and relatively adjustable with respect to said body, said scale member being provided with a first scale and a second scale calibrated in lens aperture and exposure time values for a photographic camera, said first scale being arranged contiguous to and movable along said wedge, when said member is set to varying positions relative to said body, whereby to variably coordinate said marks with the graduations of said first scale, a third relatively fixed scale upon said body calibrated in values of emulsion sensitivity, said third scale being arranged contiguous and in cooperative relation to said second scale, whereby upon adjustment of said scale member to align a pair of preselected exposure controlling values of said second and third scales, the corresponding exposure control value of said first scale for a given scene brightness will be opposite to the mark of said wedge just barely visible when said wedge is subjected to transillumination by light rays emanating from a photographic scene in the operative position of said meter, and a further relatively fixed scale upon said body calibrated in values of an additional factor determining the exposure reading, and index means for said wedge movable along said further scale.

8. An extinction type photographic exposure meter comprising a body, a photometric wedge light gauge adjustably mounted upon said body, said wedge having a series of substantially identical and adjacently situated visible test marks of increasingly varying contrast relative to their adjacent areas, a scale member mounted upon said body substantially independently of said wedge and relatively adjustable with respect to said body, said scale member being provided with a first and a second scale calibrated in lens aperture and exposure time values for a photographic camera, said first scale being arranged contiguous to and movable along said wedge, when said scale member is set to varying positions relative to said body, whereby to variably coordinate said marks with the graduations of said first scale, a third relatively fixed scale upon said body calibrated in emulsion speed values, said third scale being arranged contiguous and in cooperative relation to said second scale, whereby upon initial adjustment of said scale member to align a pair of preselected exposure values of said second and third scales, the corresponding exposure value of said first scale for an existing scene brightness will be opposite the mark of said wedge just barely visible, when said wedge held at a distance from the observer's eye is subjected to illumination by light rays emanating from a photographic scene in the operative position of said meter, and a further relatively fixed scale upon said body calibrated in general lighting conditions, and index means carried by said wedge and movable along said further scale, for adjusting said wedge to compensate for the error due to the varying eye sensitivity under different general lighting conditions to which the eye is exposed.

9. An extinction type exposure meter comprising a body, a first photometric wedge light gauge adjustably mounted upon said body, said wedge having a series of substantially identical and adjacently situated visible test marks of increasingly varying contrast relative to their adjacent areas, a scale member adjustable relative to said body and provided with a first and second scale calibrated in lens aperture and exposure time values for a photographic camera, said first scale being arranged contiguous to and movable along said wedge, a third relatively fixed scale upon said body calibrated in emulsion speed values and arranged contiguous and in cooperative relation to said second scale, whereby upon initial adjustment of said scale member to align a pair of preselected exposure values of said second and third scales, the corresponding exposure value of said first scale for an existing scene brightness will be opposite to the mark of said wedge being just barely visible when said wedge, held at a distance from the observer's eye, is subjected to transillumination by light rays emanating from a photographic scene in the operative position of said meter, means to limit the effective acceptance angle of said wedge to light rays emanating from the scene to be photographed, a further photometric wedge light gauge mounted upon said body and also having a series of substantially identical and adjacently situated visible test marks of increasingly varying contrast relative to their adjacent areas, said further wedge being arranged relative to said first wedge to be illuminated, in the operative position of said meter, by light rays arriving from directions exterior of said acceptance angle and to which the observer's eyes are exposed, both said light gauges being further arranged relative to each other so as to be simultaneously readable in the operative position of said meter, and an index associated with said first wedge and arranged to move along said further wedge.

KARL RATH.